United States Patent
Fukushima et al.

(10) Patent No.: US 9,019,457 B2
(45) Date of Patent: Apr. 28, 2015

(54) LIQUID CRYSTAL DISPLAY ELEMENT

(75) Inventors: Hiroto Fukushima, Yokohama (JP); Yoshihisa Iwamoto, Yokohama (JP)

(73) Assignee: Stanley Electric Co., Ltd., Tokyo (JP)

(*) Notice: Subject to any disclaimer, the term of this patent is extended or adjusted under 35 U.S.C. 154(b) by 36 days.

(21) Appl. No.: 13/267,180

(22) Filed: Oct. 6, 2011

(65) Prior Publication Data
US 2012/0086894 A1    Apr. 12, 2012

(30) Foreign Application Priority Data
Oct. 12, 2010    (JP) .................................. 2010-229284

(51) Int. Cl.
G02F 1/1343    (2006.01)
G02F 1/139    (2006.01)
G02F 1/1337    (2006.01)

(52) U.S. Cl.
CPC ........ G02F 1/1393 (2013.01); G02F 1/133711 (2013.01)

(58) Field of Classification Search
USPC ................... 349/145, 146, 130, 142
See application file for complete search history.

(56) References Cited

U.S. PATENT DOCUMENTS

| | | | | |
|---|---|---|---|---|
| 6,369,870 B1* | 4/2002 | Koma | ............................ | 349/130 |
| 6,522,379 B1* | 2/2003 | Ishihara et al. | ................ | 349/139 |
| 8,253,901 B2* | 8/2012 | Do et al. | ........................ | 349/123 |
| 2003/0223028 A1* | 12/2003 | Hirota | ............................ | 349/141 |
| 2009/0086132 A1* | 4/2009 | Horii et al. | ..................... | 349/103 |
| 2010/0007808 A1* | 1/2010 | Choi et al. | ....................... | 349/33 |
| 2011/0001914 A1* | 1/2011 | Tanaka | ........................... | 349/139 |

FOREIGN PATENT DOCUMENTS

| | | |
|---|---|---|
| EP | 2 233 969 A2 | 9/2010 |
| EP | 2 458 429 A1 | 5/2012 |
| JP | 10-301114 A | 11/1998 |
| JP | 2872628 B2 | 1/1999 |
| JP | 2005-234254 A | 9/2005 |
| JP | 2009-086214 A | 4/2009 |

(Continued)

OTHER PUBLICATIONS

Japanese Office Action dated Aug. 6, 2013 (and English translation thereof) in counterpart Japanese Application No. 2010-229284.

(Continued)

*Primary Examiner* — Richard Kim
*Assistant Examiner* — Kendrick Hsu
(74) *Attorney, Agent, or Firm* — Holtz, Holtz, Goodman & Chick PC

(57) ABSTRACT

A liquid crystal display element comprises a first and a second substrates, a vertical alignment liquid crystal layer, and a first and a second polarizers arranged to cross approximately their absorption axes and an alignment direction of liquid crystal molecules when no voltage is applied at almost 45 degrees. At least one of the electrodes comprises a polyline extending to an extending direction as a whole and having no straight line in parallel to the extending direction along an electrode edge, and the polyline is formed along an edge of at least one of the first and the second electrodes where the alignment directions when a voltage is applied and when no voltage is applied are opposite to each other if the polyline is a straight line along the extending direction.

3 Claims, 6 Drawing Sheets

(56) References Cited

FOREIGN PATENT DOCUMENTS

| | | |
|---|---|---|
| JP | 2009-133910 A | 6/2009 |
| JP | 2010-224233 A | 10/2010 |

OTHER PUBLICATIONS

Japanese Office Action dated Apr. 22, 2014 (and English translation thereof) in counterpart Japanese Application No. 2010-229284.

* cited by examiner

FIG. 1
PRIOR ART
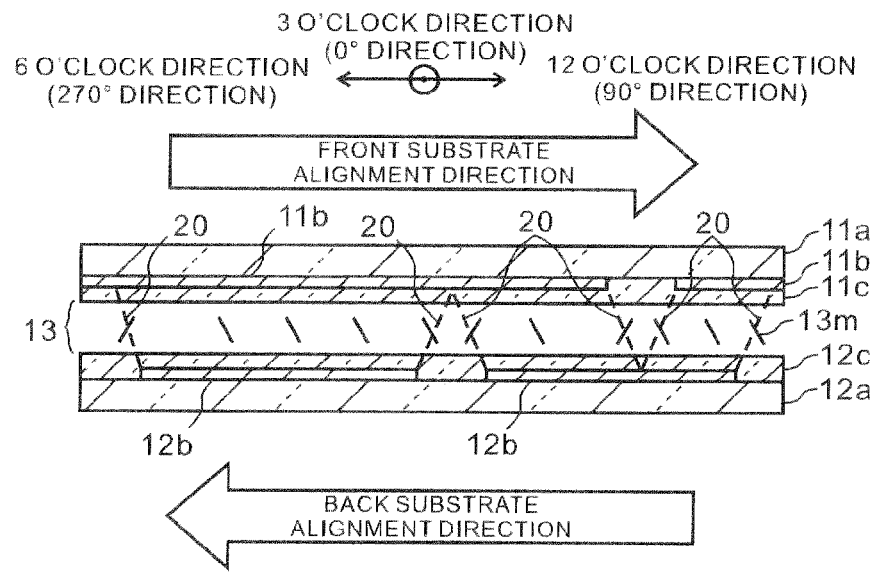
FIG. 2A
PRIOR ART
FIG. 2B
PRIOR ART
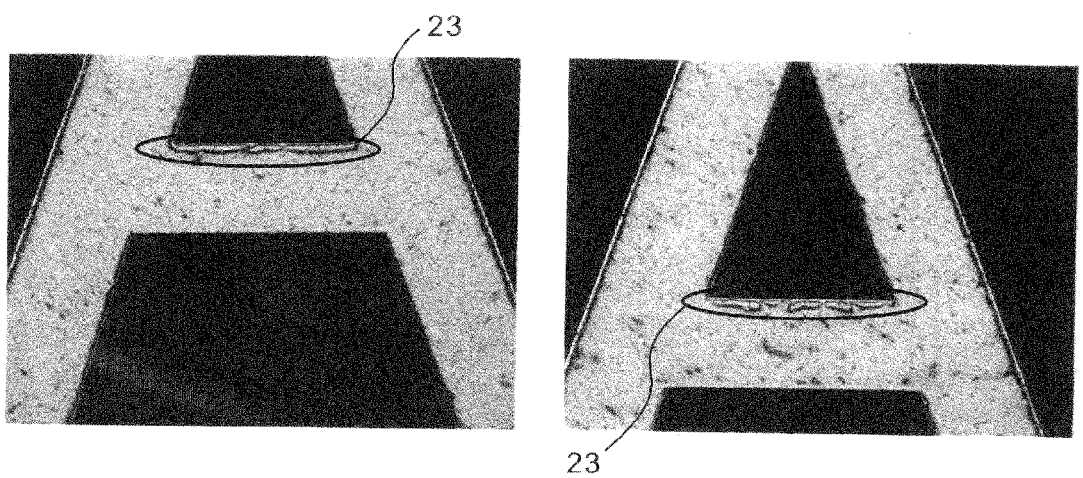

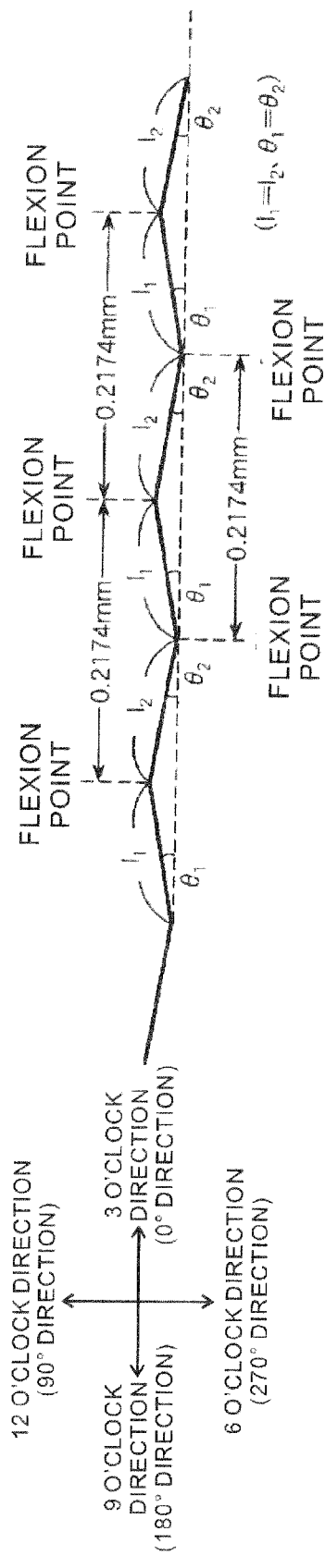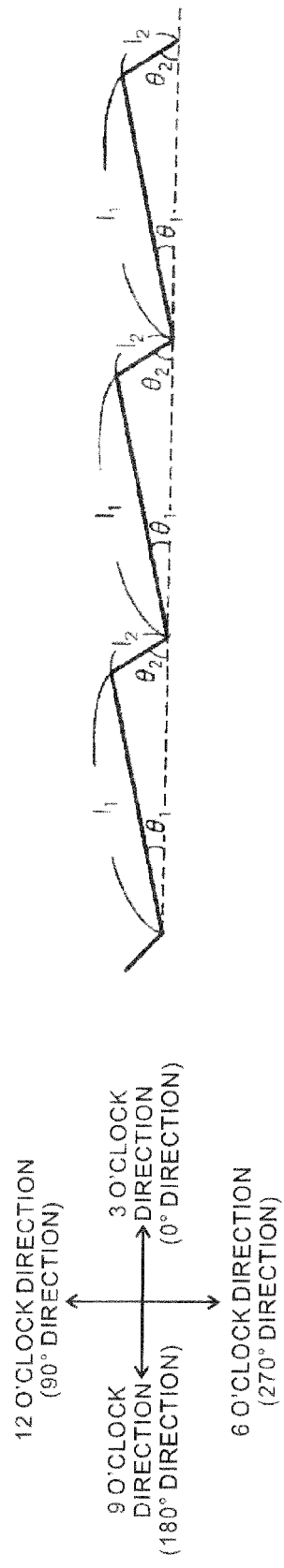

LIQUID CRYSTAL DISPLAY ELEMENT

This application is based on Japanese Patent Application 2010-229284, filed on Oct. 12, 2010, the entire contents of which are incorporated herein by reference.

BACKGROUND OF THE INVENTION

A) Field of the Invention

This invention relates to a liquid crystal display element.

B) Description of the Related Art

A vertical alignment type liquid crystal display element is formed by placing a vertical alignment (VA) mode liquid crystal cell between polarizers arranged in the crossed Nicols. The VA mode liquid crystal cell consists of a liquid crystal layer placed between two front and back glass substrates, and liquid crystal molecules in the liquid crystal layer are aligned approximately perpendicular to the substrates. When viewed from a perpendicular direction to the glass substrates, optical transmission of a background display region (no-voltage applied region) of the vertical alignment type liquid crystal display element is almost similar to that of the polarizers arranged in the crossed Nicols and very low. Therefore, it is relatively easy to realize high contrast display with the vertical alignment type liquid crystal display element.

The following techniques are well-known as alignment processes for uniformly pretilted liquid crystal molecules away from the perpendicular direction between inner surfaces of the front and back substrates of the VA mode liquid crystal cell: (i) a method wherein a uniformed alignment is realized by an effect of the surface shape obtained by performing oblique deposition of a metal oxide film such as $SiO_x$ as an alignment film from a direction tilted away from the perpendicular direction to the substrate to form a surface of the deposited film in a sawlike or jagged shape; (ii) a so-called photo alignment method wherein an organic alignment film material such as polyimide, etc. is formed on an inner surface of a substrate and thereafter ultraviolet ray is irradiated to a surface of the alignment film from a direction tilted away from the perpendicular direction (refer to Japanese Patent No. 2872628); and (iii) a method wherein a vertical alignment film having a specific surface free energy is formed on an inner surface of a substrate and thereafter treated by a rubbing process (refer to Japanese Laid-Open Patent No. 2005-234254). Those methods are mono-domain alignment methods wherein liquid crystal molecules can be aligned in one direction in a liquid crystal layer of a VA mode liquid crystal cell when no voltage is applied.

FIG. 8A is a schematic cross sectional view of a vertical alignment type liquid crystal display element according to the prior art, and FIGS. 8B to 8D are schematic plan views showing parts of electrode structures of the element.

As shown in FIG. 8A, the conventional vertical alignment type liquid crystal display element consists of a front substrate 11, a back substrate 12 and a vertical alignment liquid crystal layer 13 placed between both substrates 11 and 12.

The front substrate 11 consists of a front glass substrate 11a, a segment transparent electrode 11b formed on the front glass substrate 11a and a front vertical alignment film 11c formed on the front glass substrate 11a and the segment transparent electrode 11b. Similarly the back substrate 12 consists of a back glass substrate 12a, a common transparent electrode 12b formed on the back glass substrate 12a and a back vertical alignment film 12c formed on the back glass substrate 12a and the common transparent electrode 12b. The segment transparent electrode 11b and the common transparent electrode 12b are, for example, formed of indium tin oxide (ITO).

The front and the back vertical alignment films 11c and 12c are treated with the alignment process in one direction, for example, by the above-described alignment method (ii) or (iii). When a directional coordinate system in a plane parallel to the front and the back substrates 11 and 12 is defined by defining a far side direction perpendicular to the surface of the drawing sheet as a twelve o'clock direction (90 degrees direction), a right direction in the surface of the drawing sheet as a three o'clock direction (0 degree direction), a near side direction perpendicular to the surface of the drawing sheet as a six o'clock direction (270 degrees direction), and a left direction in the surface of the drawing sheet as a nine o'clock direction (90 degree direction), for example, the front vertical alignment film 11c is treated with the alignment process to align the liquid crystal molecules in the twelve o'clock direction, and the back vertical alignment film 12c is treated with the alignment process to align the liquid crystal molecules in the six o'clock direction.

A vertical alignment liquid crystal layer 13 is a liquid crystal layer whose liquid crystal molecules are almost vertically aligned and placed between the front vertical alignment film 11c of the front substrate 11 and the back vertical alignment film 12c of the back substrate 12. For example, the vertical alignment liquid crystal layer 13 is formed of liquid crystal material having negative dielectric anisotropy and has a mono-domain structure. For example, when no voltage is applied between the segment transparent electrode 11b and the common transparent electrode 12b (hereinafter called the no-voltage-applied state), the liquid crystal molecules in the liquid crystal layer 13 are aligned approximately perpendicular to the front and the back substrates 11 and 12 When a voltage larger than threshold voltage is applied between both electrodes 11b and 12b (hereinafter called the voltage-applied state), a large part of the liquid crystal molecules in the liquid crystal layer 13 are tilted toward an in-plane direction of the substrates 11 and 12 in the alignment process direction.

A spacer 14 keeps a gap, for example, between the front substrate 11 and the back substrate 12. Both substrates 11 and 12 are adhered too each other by a sealing part 15.

A front viewing angle compensator 16 and a front polarizer 18, in this order, are placed on the front glass substrate 11a on an opposite side of the liquid crystal layer 13. Similarly a back viewing angle compensator 17 and a back polarizer 19, in this order, are placed on the back glass substrate 12a on an opposite side of the liquid crystal layer 13. The front and the back polarizers 18 and 19 are, for example, placed in crossed Nicols arrangement and also in an arrangement wherein an absorption axis and an alignment direction (the six o'clock direction) of the liquid crystal molecules in the center of the thickness of the liquid crystal layer 13 in the no-voltage-applied state cross each other at almost 45 degrees in a plane in parallel to the substrate surface. For example, the front polarizer 18 is placed to make its absorption axis direct in a 45 to 225 degrees direction, and the back polarizer 19 is placed to make its absorption axis direct in a 135 to 315 degrees direction.

The front and the back viewing angle compensators 16 and 17 are viewing angle compensators having negative uniaxial or negative biaxial optical anisotropy. When in-plane slow axes exist in the front and the back viewing angle compensators 16 and 17, the front and the back viewing angle compensators 16 and 17 are arranged to make the slow axes and transmission axes of the adjacent polarizers 18 and 19 approximately parallel to each other.

In application of the liquid crystal display element, a back light is placed behind the back polarizer 19. Light emitted from the back light transmits through the back polarizer 19 and the back viewing angle compensator 17 and is input to the liquid crystal cell. The front polarizer 18 blocks the light input to and transmitted through the liquid crystal cell in any regions when a larger voltage than a threshold voltage is not applied between the segment transparent electrode 11b and the common transparent electrode 12b and in regions except a display regions (regions where both electrodes 11b and 12b are overlapped in a direction perpendicular to the substrates 11 and 12 and where display is performed) even when the voltage is applied. Therefore, a viewer viewing the liquid crystal display element from the outside of the front polarizer 18 sees a dark display state (black display). On the other hand, in the display region when the voltage larger than the threshold voltage is applied between both electrodes 11b and 12b, the light input to the liquid crystal cell transmits through the liquid crystal cell and the front polarizer 18. Therefore, a viewer viewing the liquid crystal display element from the outside of the front polarizer 18 sees a light display state (white display).

FIG. 8B and FIG. 8C are schematic plan views respectively showing a part of the segment transparent electrode 11b and a part of the common transparent electrode 12b. Moreover, FIG. 8D is a schematic plan view showing the parts of both electrodes 11b and 12b viewed from a direction perpendicular to the front substrate 11.

The liquid crystal display element shown in FIGS. 8A to 8D is a so-called segment liquid crystal display element which realizes a shape of a display region mainly by a shape of the segment electrode 11b. The display regions in an arbitrary shape can be demarcated by a shape of an electrode in the segment liquid crystal display element. FIGS. 8B to 8D show the electrodes 11b and 12b regions that form the display region which reads a word "AUTO". Moreover, the segment liquid crystal display element is driven by a simple matrix drive such as the multiplex drive.

In order to display the word "AUTO", the segment transparent electrode 11b is formed on the front glass substrate 11a in a shape shown in FIG. 8B. Moreover, the common transparent electrode 12b is formed on the back glass substrate 12a in a shape shown in FIG. 8C. The front substrate 11 and the back substrate 12 are arranged in approximately parallel to each other with making the surfaces where the electrodes 11b and 12b are formed face each other. Moreover, the front substrate 11 and the back substrate 12 are adhered to each other by positioning them as shown in FIG. 8D to form an overlapped region where both electrodes 11b and 12b overlap in a shape of the word "AUTO". With a combination of the electrode structures shown in FIGS. 8B to 8D and the mono-domain vertical alignment liquid crystal layer, it becomes possible to realize a good dark display state in the region other than the display region.

It is known that the liquid crystal display element shown in FIGS. 8A to 8D has the polar angular direction observation angle wherein the light display state can not be observed from the six o'clock direction whereas the good light display state can be observed from the twelve o'clock direction. The twelve o'clock direction is called the optimal viewing direction while the six o'clock direction is called the anti viewing direction.

SUMMARY OF THE INVENTION

It is an object of the present invention to provide a liquid crystal display element having a good display quality.

According to one aspect of the present invention, there is provided a liquid crystal display element, comprising: a first substrate on which a first electrode is formed; a second substrate on which a second electrode is formed and arranged in parallel to the first substrate to make the first and the second electrodes face each other; a vertical alignment liquid crystal layer placed between the first substrate and the second substrate; a first polarizer positioned on the first substrate on an opposite side of the liquid crystal layer; and a second polarizer positioned on the second substrate on an opposite side of the liquid crystal layer and arranged in almost crossed Nicols to the first polarizer, wherein the first and the second polarizers are arranged to cross approximately their absorption axes and an alignment direction of liquid crystal molecules in a center of a thickness of the liquid crystal layer when no voltage is applied between the first electrode and the second electrode at almost 45 degrees, at least one of the first and the second electrodes comprises a polyline extending to an extending direction as a whole and having no straight line in parallel to the extending direction along an edge demarcating an outline of a display region where the first and the second electrodes overlap in a direction perpendicular to the first and the second substrate, and the polyline is formed along an edge of at least one of the first and the second electrodes where the alignment direction of the liquid crystal molecules in the center of the thickness of the liquid crystal layer when a voltage is applied between the first electrode and the second electrode and the alignment direction in the no-voltage-applied state are opposite to each other if the polyline is a straight line along the extending direction.

According to the present invention, a liquid crystal display element having a good display quality can be provided.

BRIEF DESCRIPTION OF THE DRAWINGS

FIG. 1 is a schematic cross sectional view showing a part of a liquid crystal cell of the vertical alignment type liquid crystal display element according to the prior art shown in FIGS. 8A to 8D in a different cross section from FIG. 8A.

FIGS. 2A and 2B are polarizing-microscope photographs showing alignment textures near a horizontal line of a character "A" in the display region "AUTO" when a voltage is applied in the vertical alignment type liquid crystal display element according to the prior art shown in FIGS. 8A to 8D.

FIGS. 6A and 6B are schematic plan views showing polylines formed at edges of the segment transparent electrode 11B and the common transparent electrode 12B.

DESCRIPTION OF THE PREFERRED EMBODIMENTS

When the conventional alignment type liquid crystal display element is viewed from the anti viewing direction in the voltage-applied state, a dark display state is observed. However, in case that there is a side which is approximately perpendicular to the optimal viewing direction or to the anti viewing direction in the display region (for example, a horizontal line in a character "A" in the example shown in FIGS. 8A to 8D), light leakage is observed near an edge of the side. There may be found non-uniformity in a degree of light leakage which drops a display quality. Moreover, even if display patterns are the same, degrees of light leakage near display region edges viewed from the anti viewing direction may be different from each other and a display quality may be dropped depending on an arrangement of the display patterns. Those degradations in the display qualities are observed when viewed from directions within a range of 70 degrees to the right or left from the anti viewing direction.

The inventors of the present invention thought that the difference in the degrees of light leakage was generated by the following reason.

Figure 8A:
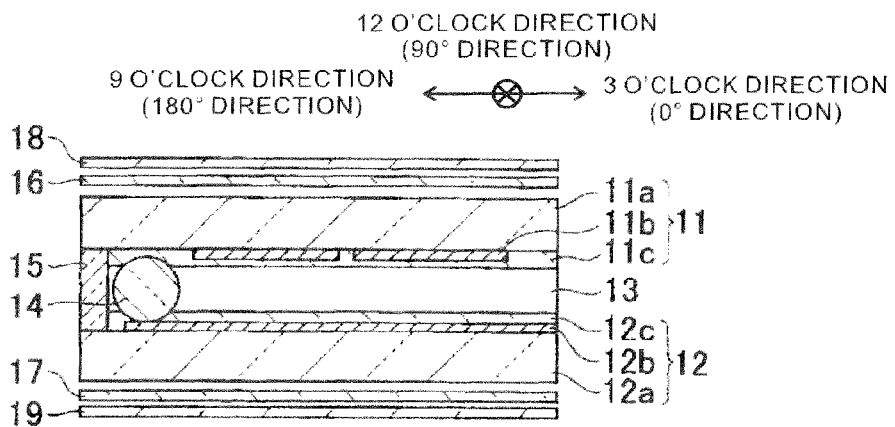
FIG. 8A is a schematic cross sectional view showing a vertical alignment type liquid crystal display element according to the prior art.
Figure 8B:
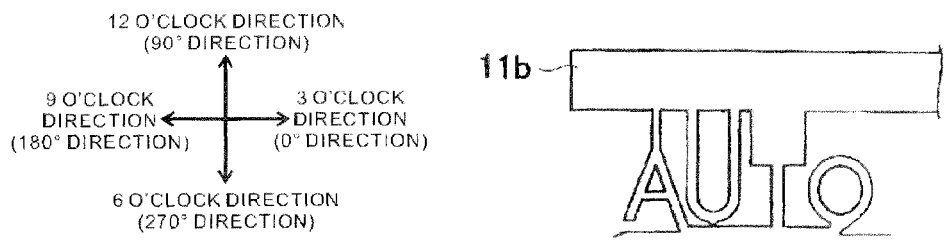
FIGS. 8B to 8D are schematic plan views showing parts of its electrode structures.
Figure 8C:
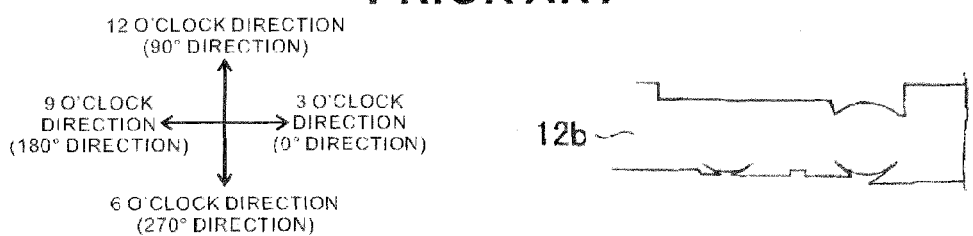
Figure 8D:
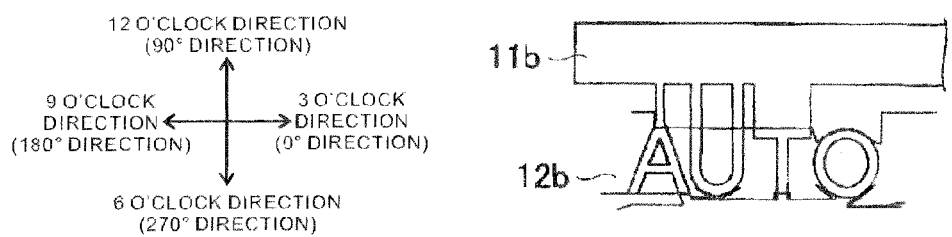

FIG. 1 is a schematic cross sectional view showing a part of a liquid crystal cell of the vertical alignment type liquid crystal display element according to the prior art shown in FIGS. 8A to 8D in a different cross section from FIG. 8A. As described in the above, the front vertical alignment film 11c is treated with the rubbing process in the twelve o'clock direction, and the back vertical alignment film 12c is treated with the rubbing process in the six o'clock direction. Therefore, in the voltage-applied state, the liquid crystal molecules in the center of the thickness of the liquid crystal layer (hereinafter called the liquid crystal layer center molecules 13m) are tilted in the six o'clock direction. Therefore, the optimal viewing direction of the liquid crystal display element becomes the twelve o'clock direction, and the anti viewing direction becomes the six o'clock direction.

At edges of the segment transparent electrode 11b and the common transparent electrode 12b, oblique electric fields 20 are generated in the liquid crystal layer 13. In FIG. 1, the oblique electric fields 20 in the liquid crystal layer 13 are represented by broken lines. In a region of the liquid crystal layer 13 on which the oblique electric field 20 strongly influences, the liquid crystal layer center molecules 13m are aligned perpendicular to the oblique electric field 20. Therefore, the alignment direction of the liquid crystal layer center molecules 13m in parts of regions near the edges of the electrodes 11b and 12b becomes an opposite direction (180 degrees different direction) to the alignment direction of the liquid crystal layer center molecules 13m in a region of the liquid crystal layer 13 on which the oblique electric field 20 does not influence (a region where the alignment direction of the liquid crystal molecules are determined by the direction of the alignment process to the alignment films 11c and 12c). As in the above, even if the liquid crystal display element has the mono-domain structure, a multi-domain structure wherein the alignment directions are different near the edges is substantially realized in a display region in the voltage-applied state. By that, it is considered that the light leakages are observed near the edges of the display region even if viewed from the anti viewing direction.

The dark region (dark line) is formed in an intermediate region between regions where alignment directions of the liquid crystal layer center molecules 13m are opposite to each other.

FIGS. 2A and 2B are polarizing-microscope photographs showing alignment textures near a horizontal line of a character "A" in the display region "AUTO" when a voltage is applied in the vertical alignment type liquid crystal display element according to the prior art shown in FIGS. 8A to 8D. Both photographs show the aligned textures in the same electrode patterns. In both FIGS. 2A and 2B it is found that two curved dark lines are formed near an upper edge 23 of the horizontal line of "A".

Figure 3:
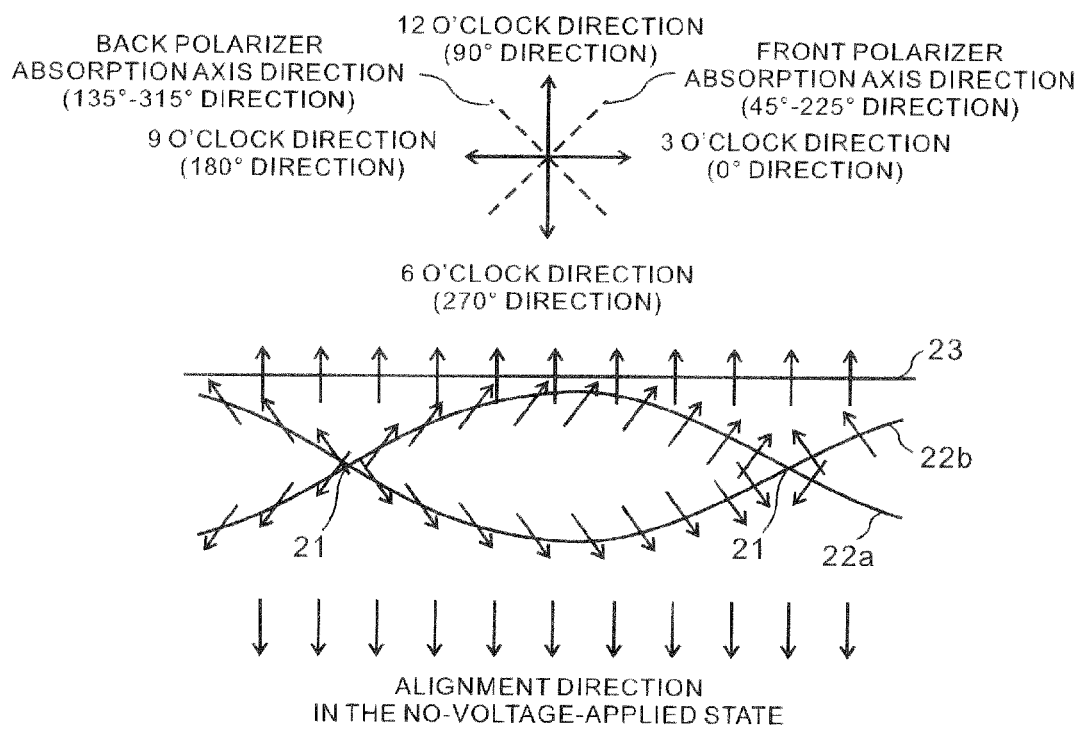
FIG. 3 is a schematic plan view showing a relationship between a dark region and an alignment direction of liquid crystal molecules 13m in a center of a liquid crystal layer.

FIG. 3 is a schematic plan view showing a relationship between a dark region and an alignment direction of the liquid crystal layer center molecules 13m. In this figure, directions of arrows represent alignment directions of the liquid crystal layer center molecules 13m in the voltage-applied state.

As shown in the figure an alignment direction of the liquid crystal layer center molecules 13m (the alignment direction in the no-voltage-applied state) in a region on which the oblique electric field 20 does not influence becomes the six o'clock direction. Moreover, the alignment direction of the liquid crystal layer center molecules 13m at an upper edge 23 of the horizontal line of the character "A" becomes the twelve o'clock direction. The two dark region 22 (for example, the first dark region (dark line) 22a and the second dark region (dark line) 22b) are formed between the upper edge 23 and the region on which the oblique electric field 20 does not influence.

In an intermediate region where the alignment directions of the liquid crystal layer center molecules 13m are opposite to each other, the alignment directions of the liquid crystal layer center molecules 13m changes continuously from one direction to another direction. Therefore, the first dark region 22a is formed, for example, in a position where the alignment direction of the liquid crystal layer center molecules 13m is almost 45 degrees direction which is parallel to the direction of the front polarizer absorption axis (45 to 225 degrees direction). Moreover, the second dark region 22b is formed, for example, in a position where the alignment direction of the liquid crystal layer center molecules 13m is 315 degrees direction which is parallel to the direction of the back polarizer absorption axis (135 to 315 degrees direction).

The directions (rotating direction) of continuously changing the alignment directions of the liquid crystal layer center molecules 13m in the regions where the first and the second dark regions 22 are formed are opposite to those in the region adjoining to those regions in the 3-9 o'clock directions. For example, when the alignment directions of the liquid crystal layer center molecules 13m continuously rotate clockwise in the regions where the first and the second dark regions 22 are formed, the alignment directions of the liquid crystal layer center molecules 13m rotate counterclockwise in the adjoining regions. Therefore, for example, the dark region is formed near the upper edge 23 of the horizontal line of "A" by connecting the positions where the alignment directions of the liquid crystal layer center molecules 13m are 135 degrees direction, and the dark region far from the upper edge 23 of the horizontal line of "A" by connecting the positions where the alignment directions of the liquid crystal layer center molecules 13m are 225 degrees direction. Then, disclination 21 where the alignment directions of the liquid crystal molecules are disconnected appears at the position where the directions of continuously changing directions (rotating directions) of the alignment directions of the liquid crystal layer center molecules 13m become opposite directions.

As described in the above, the inventors of the present invention considered that the dark regions 22 generated in the intermediate regions where the alignment directions of the liquid crystal layer center molecules 13m are opposite to each other are caused, for example, by the oblique electric field 20 which aligns the liquid crystal layer center molecules 13m in a direction opposite to the alignment direction in the no-voltage-applied state, and that the dark regions 22 are formed in the positions where the alignment directions of the liquid crystal layer center molecules 13m are approximately parallel to the absorption axis direction of the polarizers, and also the disclination 21 is formed at the position where continuously changing directions (rotating directions) of the alignment directions of the liquid crystal layer center molecules 13m become opposite directions.

Referring to FIGS. 2A and 2B again, it is found that the above-described consideration agrees with the photographs wherein the generations of two curved-line dark regions are observed near the upper edge of the horizontal line of "A" whereas no dark region is generated near the lower edges where the alignment directions of the liquid crystal molecules are the same in the region on which the oblique electric field influences and in the region on which the oblique electric field does not influence.

Moreover, comparing the two photographs, it can be found that the positions of the disclinations and the shapes of the dark regions generated near the upper edges of the horizontal lines of the characters "A" are completely different from each other and irregular even though the electrode patterns in the two photographs are the same. The inventors of the present invention considered that the non-uniformity in the light leakages when viewed from the anti viewing direction was generated by the irregularity of the dark region patterns.

The inventors of the present invention fabricated a liquid crystal display element having an electrode structure wherein edges of electrodes composing a display region does not cross an alignment direction of the liquid crystal layer center molecules 13m in the no-voltage applied state at a right angle. This liquid crystal display element controls the curved line shape of the dark region by a generating position of the disclination and eliminates the irregularity of the dark region patterns to prevent the non-uniformity of the light leakages.

Figure 4:
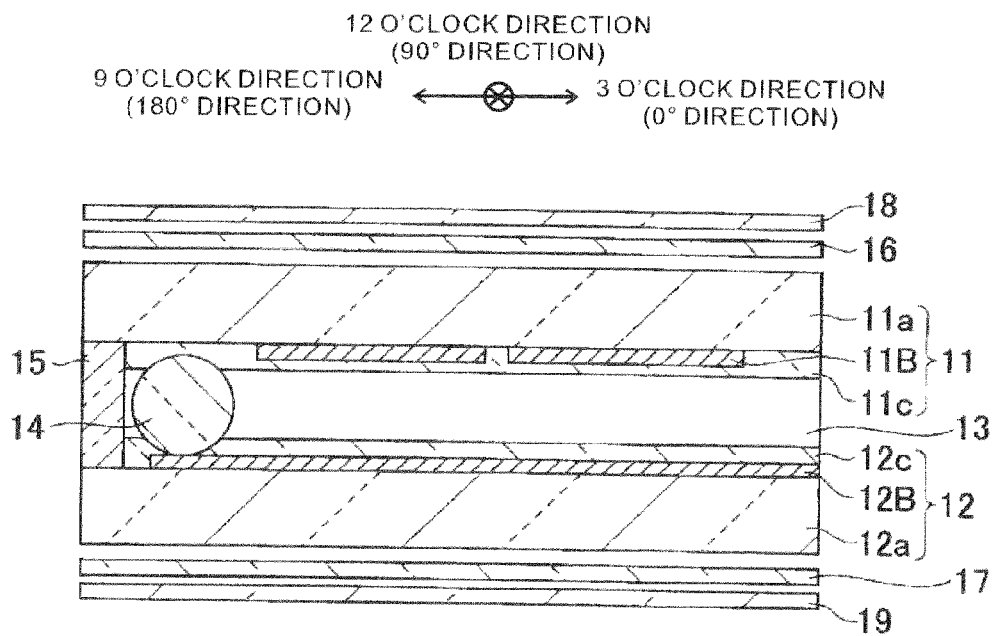
FIG. 4 is a schematic cross sectional view showing a monodomain vertical alignment type liquid crystal display element according to an embodiment of the present invention.

FIG. 4 is a schematic cross sectional view showing a mono-domain vertical alignment type liquid crystal display element according to an embodiment of the present invention. The vertical alignment type liquid crystal display element according to the embodiment is different in a segment transparent electrode 11B and a common transparent electrode 12B from the liquid crystal display element according to the prior art shown in FIGS. 8A to 8D. Other components are similar to those in the prior art.

A manufacturing method of the mono-domain vertical alignment type liquid crystal display element will be explained with reference to FIG. 4.

Two blue glass substrates, one surface of each substrate being polished and covered with a $SiO_2$ undercoat on which an ITO film are formed, are prepared, and by patterning the ITO film on each substrate by photolithography and etching, a front glass substrate 11a on which segment transparent electrodes 11B are formed and a back glass substrate 12a on which common transparent electrodes 12B are formed are fabricated. Based on necessity, an insulating layer made of $SiO_2$, etc. may be formed on a part of surfaces of the electrodes 11B and 12B.

After cleaning the glass substrates 11a and 12a with the electrodes 11B and 12B by using alkaline solution or the like, vertical alignment films made by Chisso Petrochemical Corporation are coated on the electrodes 11B and 12B and the glass substrates 11a and 12a by flexo-printing and baked at 180 degrees Celsius for 30 minutes in a clean oven. A rubbing process in a predetermined direction in an in-plane direction of the substrate is performed by using cotton rubbing cloth to each one of the front and the back vertical alignment films 11c and 12c obtained by the above processes. By that, a front substrate (segment substrate) 11 consisting of the front glass substrate 11a, the segment transparent electrode 11B formed on the front glass substrate 11a and the front vertical alignment film 11c formed on the front glass substrate 11a and the segment transparent electrode 11B is obtained. Moreover, a back substrate (common substrate) 12 consisting of the back glass substrate 12a, the common transparent electrode 12B formed on the back glass substrate 12a, the back vertical alignment film 12c formed on the back glass substrate 12a and the common transparent electrode 12B.

On all over the surface of the front substrate 11, black plastic spacer made by Hayakawa Rubber Co., Ltd. with a rod diameter of about 5 μm is sprayed by a dry-spraying method. On the back substrate 12, thermal-curing type sealing material 15 made by Mitsui Chemicals, Inc. mixed with rod-shaped glass spacers 14 with a rod diameter of about 4.5 μm is coated with predetermined patterns by a dispenser. Thereafter, both substrates 11 and 12 are positioned to face the surfaces on which the electrodes 11B and 12B are formed and make the alignment directions (rubbing directions) anti-parallel and adhered approximately in parallel to each other. Then the sealing material is cured by thermo-compression bonding, and the fabrication of an empty cell is completed. The alignment directions of the front substrate 11 and the back substrate 12 are the twelve o'clock direction and the six o'clock direction respectively.

Liquid crystal material having negative dielectric anisotropy $\Delta\epsilon$ made by Merk Ltd. is injected to the empty cell by using a vacuum injection method and thereafter the cell is sealed while being treated with a pressing process and baked at 120 degrees Celsius for an hour.

Polarizers SHC13U made by Polatechno Co., Ltd. are adhered to the surfaces of the front and the back glass substrates 11a and 12a with making the front and the back polarizers 18 and 19 arranged in crossed Nicols, and making an absorption axis of each one of the polarizers 18 and 19 cross the alignment directions of the liquid crystal layer center molecules 13m (the alignment direction in the no-voltage-applied state; the six o'clock direction) approximately at 45 degrees. Based on necessity, a front viewing angle compensator 16 can be arranged between the front glass substrate 11a and the polarizer 18, and also a back viewing angle compensator 17 can be arranged between the back glass substrate 12a and the polarizer 19.

Moreover, as a result of a measurement, a thickness of the liquid crystal layer 13 was about 4.3 μm and a pretilt angle in the liquid crystal layer 13 was about 89.9 degrees in the vertical alignment type liquid crystal display element according to the embodiment. The retardation of the liquid crystal layer 13 is about 1100 nm.

Figure 5A:
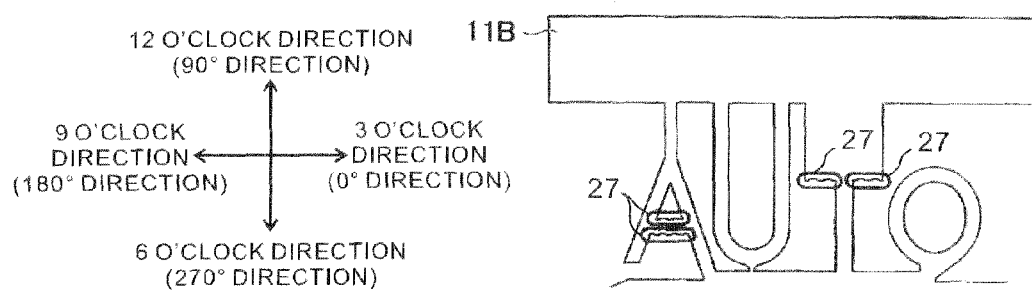
FIGS. 5A to 5C are schematic plan views showing a segment transparent electrode 11B and a common transparent electrode 12B of the mono-domain vertical alignment type liquid crystal display element according to the embodiment of the present invention.
Figure 5B:
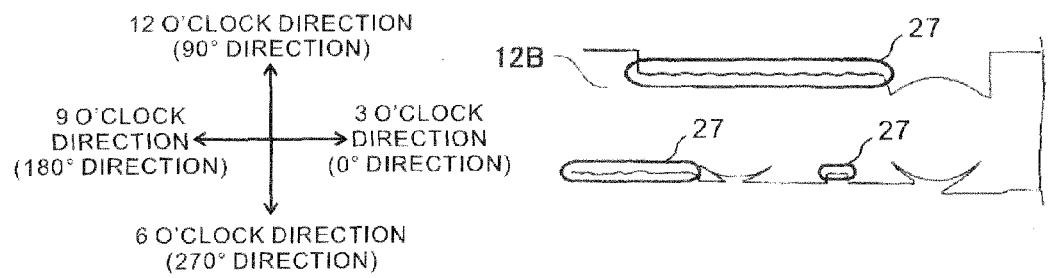
Figure 5C:
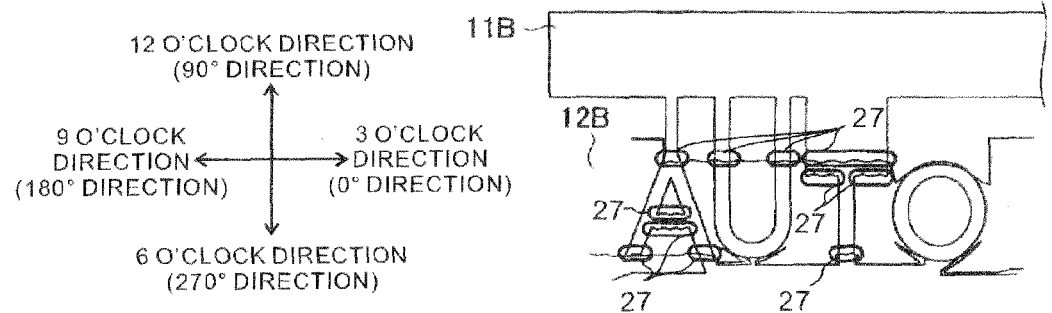

FIGS. 5A to 5C are schematic plan views showing parts of the segment transparent electrode 11B and the common transparent electrode 12B of the mono-domain vertical alignment type liquid crystal display element according to the embodiment of the present invention.

FIG. 5A shows a structure of the segment transparent electrode 11B. The segment transparent electrode 11B is different from the segment transparent electrode 11b according to the prior art shown in FIG. 8B in that electrode edges in regions (polyline regions) 27 surrounded by bold lines in the figure are formed without a straight line (or line segments) which is parallel to the 3-9 o'clock direction (the direction perpendicular to the alignment direction of the liquid crystal layer center molecules 13m in the no-voltage-applied state). In this specification the term "polyline" refers to a continuous line composed of one or more line segments.

FIG. 5B shows a structure of the common transparent electrode 12B. The common transparent electrode 12B is different from the common transparent electrode 12b according to the prior art shown in FIG. 8C in that electrode edges in regions (polyline regions) 27 surrounded by bold lines in the figure are formed without a straight line (or line segments) which is parallel to the 3-9 o'clock direction. Other features of the segment transparent electrode 11B and the common transparent electrode 12B are similar to those of the segment transparent electrode 11b and the common transparent electrode 12b according to the prior art. Moreover, the polyline regions 27 of the segment transparent electrode 11B and the common transparent electrode 12B extend to the 3-9 o'clock direction as a whole.

FIG. 5C is a schematic plan view showing a positional arrangement of the electrodes 11B and 12B viewed from a direction perpendicular to the substrates 11 and 12. Similar to the electrodes 11b and 12b according to the prior art shown in FIG. 8D, the electrodes 11B and 12B are positioned to make regions where both electrodes 11B and 12B overlap represent only the words "AUTO" when viewed from the direction perpendicular to the substrates 11 and 12.

The polyline regions 27 of the electrodes 11B and 12B according to the embodiment are formed where the electrode edges formed by straight lines along the 3-9 o'clock direction of the electrode edges of the electrodes 11b and 12b composing the edge (outline) of the display region displaying the word "AUTO" in the vertical alignment type liquid crystal display element according to the prior art shown in FIGS. 8A to 8D when viewed from the direction perpendicular to the substrates 11 and 12. Therefore, in the vertical alignment type liquid crystal display element according to the embodiment, the edges (of the electrodes 11B and 12b) demarcating the display region has no line or line segment in parallel to the 3-9 o'clock direction.

Moreover, the polyline region 27 is formed in one of the electrode actually demarcating the outline of the display region.

FIGS. 6A and 6B are schematic plan views showing the polylines formed at the edges of the segment transparent electrode 11B and the common transparent electrode 12B. In FIGS. 6A and 6B, broken lines represent 3-9 o'clock direction.

The edges of the electrodes 11B and 12B of the vertical alignment type liquid crystal display element according to the embodiment has polylines, for example, represented by solid line segments shown in FIG. 6A. The polyline is in a shape wherein two types of line segments (with lengths of $l_1$ and $l_2$ respectively) extending to two different directions (a direction turning counterclockwise at an angle $\theta_1$ with the three o'clock direction and a direction turning clockwise at an angle $\theta_2$ with the three o'clock direction) are connected to each other at the ends of the line segments (flexion points). In this example shown in FIG. 6A, the angle $\theta_1$ and the angle $\theta_2$ are the same, and the lengths $l_1$ and $l_2$ are the same. The angle $\theta_1$ ($\theta_2$) is larger than five degrees but not larger than 15 degrees. More preferably the angle $\theta_1$ ($\theta_2$) is not smaller than ten degrees but not larger than 15 degrees. When the continuous two line segments (extending to the different directions with lengths of $l_1$ and $l_2$) are considered as one unit, the unit of the line segments is aligned along the 3-9 o'clock direction, for example, at a pitch of 0.2174 mm. Moreover, the ends (flexion points) where two line segments are connected are extending along the 3-9 o'clock direction as a whole. A distance between the adjacent flexion points along the 3-9 o'clock direction is, for example, 0.1087 mm.

FIG. 6B shows a modified example of the polyline. For example, the polyline may consist of two line segments whose rotation angles $\theta_1$ and $\theta_2$ are different from each other, and the length ($l_1$) of one line segment is three times longer or more than the length ($l_2$) of another line segment. In this case, the angle $\theta_1$ is larger than five degrees but not larger than 15 degrees, and more preferably the angle $\theta_1$ is not smaller than ten degrees but not larger than 15 degrees. This type of polyline is in a shape of a sawlike shape as shown in the figure. Moreover, in this case, the angle $\theta_2$ may be 90 degrees.

As described in FIGS. 6A and 6B, the polyline can be formed by alternately connecting the first line segment having the length $l_1$ and extending to one direction at the angle $\theta_1$ with the 3-9 o'clock direction and the second line segment having the length $l_2$ and extending to another direction at the angle $\theta_2$ with the 3-9 o'clock direction, wherein at least one of the angles $\theta_1$ and $\theta_2$ is larger than five degrees but not larger than 15 degrees, and more preferably not smaller than ten degrees but not larger than 15 degrees.

Figure 7A:
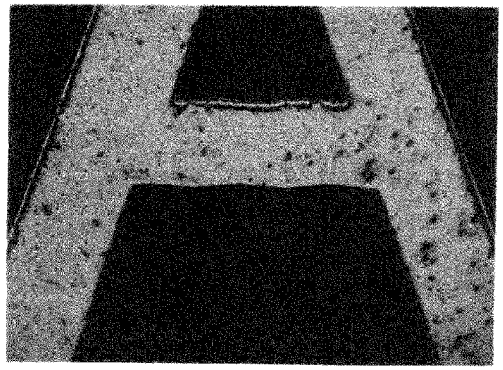
FIGS. 7A to 7C are polarizing-microscope photographs showing alignment textures near a horizontal line of a character "A" in the display region "AUTO" when a voltage is applied.
Figure 7B:
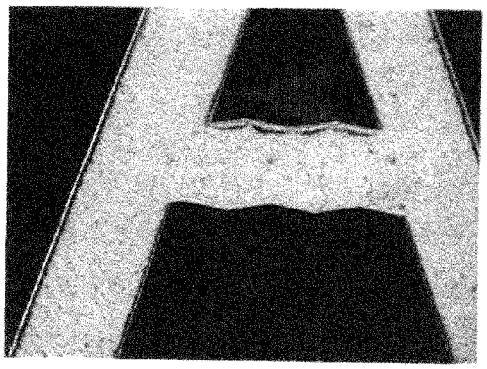
Figure 7C:
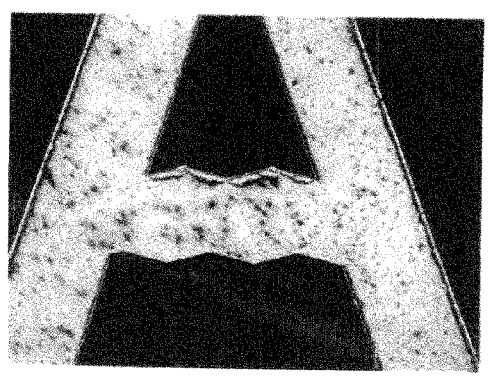

FIGS. 7A to 7C are polarizing-microscope photographs showing alignment textures near a horizontal line of a character "A" in the display region "AUTO" in the voltage-applied state. The upper and the lower edges of the horizontal line of the display region "A" are composed of the polylines reflected by the polyline shapes of the upper and the lower edges of the segment transparent electrode 11B at the region. FIGS. 7A to 7C are photographs of the display regions of the liquid crystal display elements whose angles $\theta_1$ ($\theta_2$) in FIG. 6A are respectively 5, 10 and 15 degrees.

In all the photographs in FIGS. 7A to 7C, it can be recognized that the disclinations 21 appear in the display regions near the flexion points. Moreover, it can be understood that the curved line shapes of the dark regions resemble each another and the dark region patterns are regular. The resemblance of the curved line shapes of the dark regions and the regularity of the dark region patterns seem to be caused by that the disclinations 21 are generated near the flexion points and the formations of the dark regions are started from the flexion points.

The resemblance of the curved line shapes of the dark regions and the regularity of the dark region patterns are remarkable when the angle $\theta_1$ ($\theta_2$) shown in FIG. 7B or 7C is 10 or 15 degrees. Comparing to those angles, the angle $\theta_1$ ($\theta_2$) of 5 degrees shown in FIG. 7A is not sufficient. Therefore, the angle $\theta_1$ ($\theta_2$) according to the embodiment is preferably set to larger than 5 degrees but not larger than 15 degrees. Moreover, it is more preferable to set the angle $\theta_1$ ($\theta_2$) to not less than ten degrees and not larger than 15 degrees. It is similar for the angle $\theta_1$ according to the modified example of the embodiment.

Moreover, it has been understood by observation from the front that the degradation in the display quality by changing the straight line to the polyline is allowable when the angle $\theta_1$ ($\theta_2$) is not larger than 15 degrees.

By observing a plurality of the same display patterns, it has been confirmed that the dark regions with the almost same curved line shapes and the almost same dark region patterns are formed in the upper edge of the horizontal line of the character "A" when the angle $\theta_1$ ($\theta_2$) is 10 or 15 degrees. Moreover, as a result of observing the liquid crystal display element according to the embodiment from the anti viewing direction, it has been confirmed that the non-uniformity of the light leakages near the display region edges is remarkably improved.

The liquid crystal display element according to the embodiment has a good display quality wherein the curved line shapes of the dark regions are uniformed and the non-uniformity of the light leakages are prevented by controlling a generating position of disclination 21 in order to regulate the dark region patterns.

The present invention has been described in connection with the preferred embodiments. The invention is not limited only to the above embodiments.

For example, in the embodiment, the electrode edge demarcating the display region has a structure without a straight line part perpendicular to the alignment direction of the liquid crystal layer center molecules in the no-voltage-applied state as shown in FIGS. 5A to 5C. However, for example, the lower edge of the horizontal line of the character "A" may be formed with a straight line without using the polyline. That is because the alignment direction of the liquid crystal layer center molecules by the oblique electric field 20 in the voltage-applied state is similar to that in the no-voltage-applied state.

The polyline region may be formed along an electrode edge where the alignment directions of the liquid crystal layer center molecules in the voltage-applied state and in the no-voltage-applied state are opposite to each other if the polyline is a straight line along its extending direction. If such electrode edge exists only in the segment transparent electrode 11B, the polyline region may be formed only in the segment transparent electrode 11B. If such electrode edge exists only in the common transparent electrode 12B, the polyline region may be formed only in the common transparent electrode 12B. The polyline region may be formed in at least one of the segment transparent electrode 11B and the common transparent electrode 12B.

Although the polyline regions are formed at the electrode edges which are not display region edges in the embodiment as shown in FIG. 5B, the polyline regions may be formed only at the electrode edges at the above-described position.

For convenience of setting the electrode patterns, the electrode edge demarcating the display region may have a structure without a straight line part perpendicular to the alignment direction of the liquid crystal molecules at the center of the liquid crystal layer in the no-voltage-applied state, and the polyline region may be formed at the electrode edge not demarcating the display region.

Moreover, although the polyline is composed by connecting the line segments extending to alternating directions, the polyline may be composed by connecting more than two line segments extending to more than two directions. Furthermore, the polyline is not limited to be composed of straight line segments but may be composed of a plurality of curved line segments.

Although both vertical alignment films 11c and 12c are treated with the alignment process in the embodiment, for example, only either one of the alignment films may be treated with the alignment process. Moreover, the alignment process may be performed to twist the liquid crystal molecules in the liquid crystal layer 13, or chiral dopant may be added.

It is apparent that various modifications, improvements, combinations, and the like can be made by those skilled in the art.

For example, the embodiment of the present invention can be applied to any vertical alignment type liquid crystal display elements having a segment such as a car-mounted information display device, a personal-use information display device, etc.

What are claimed are:

1. A segment type liquid crystal display element, comprising:
    a first substrate on which a first electrode is formed;
    a second substrate on which a second electrode is formed and which is arranged in parallel to the first substrate such that the first and second electrodes face each other;
    a first vertical alignment film formed on the first substrate and the first electrode;
    a second vertical alignment film formed on the second substrate and the second electrode;
    a vertical alignment liquid crystal layer placed between the first substrate and the second substrate;
    a first polarizer positioned on the first substrate on an opposite side from the liquid crystal layer; and
    a second polarizer positioned on the second substrate on an opposite side from the liquid crystal layer and arranged in substantially crossed Nicols to the first polarizer;
    wherein:
        the first and second polarizers are arranged such that their absorption axes cross an alignment direction of liquid crystal molecules in a center of a thickness of the liquid crystal layer when no voltage is applied between the first electrode and the second electrode at substantially 45 degrees,
        at least one of the first and second electrodes comprises a polyline extending in only one extending direction as a whole and having no straight line that is parallel to the extending direction, along an edge demarcating an outline of a display region where the first and second electrodes overlap in a direction perpendicular to the first and second substrates, the extending direction being perpendicular to the alignment direction of the liquid crystal molecules in the center of the thickness of the liquid crystal layer when no voltage is applied between the first electrode and the second electrode, and
        the polyline is formed along an edge of at least one of the first and second electrodes where (i) the alignment direction of the liquid crystal molecules in the center of the thickness of the liquid crystal layer due to an oblique electric field relative to a normal of the substrates generated when a voltage is applied between the first electrode and the second electrode, and (ii) the alignment direction when no voltage is applied, would be opposite to each other if the polyline were a straight line along the extending direction,
        the polyline comprises first line segments with a first length and second line segments with a second length extending in alternating directions and connecting to each other at ends thereof, and
        the first line segments turn at a first angle with respect to the extending direction to a first direction, the second line segments turn at a second angle with respect to the extending direction to a second direction different from the first direction, and at least one of the first angle and the second angle is larger than 5 degrees and not larger than 15 degrees.

2. The liquid crystal display element according to claim 1, wherein the first length and the second length are the same, and the first angle and the second angle are the same and larger than 5 degrees and not larger than 15 degrees.

3. The liquid crystal display element according to claim 1, wherein the first length is not shorter than three times the second length, and the first angle is different from the second angle and larger than 5 degrees and not larger than 15 degrees.

* * * * *